(12) United States Patent
Chen et al.

(10) Patent No.: US 11,313,727 B2
(45) Date of Patent: Apr. 26, 2022

(54) EUV SPECTROSCOPIC POLARIMETER

(71) Applicant: NATIONAL TSING HUA UNIVERSITY, Hsinchu (TW)

(72) Inventors: Ming-Chang Chen, Kaohsiung (TW); Kuang-Yu Chang, Taoyuan (TW); Pei-Chi Huang, Yunlin County (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 16/995,798

(22) Filed: Aug. 17, 2020

(65) Prior Publication Data

US 2022/0049990 A1 Feb. 17, 2022

(51) Int. Cl.
*G01J 4/04* (2006.01)
*G01N 21/21* (2006.01)
*G01J 3/447* (2006.01)

(52) U.S. Cl.
CPC .............. *G01J 4/04* (2013.01); *G01J 3/447* (2013.01); *G01N 21/21* (2013.01); *G01N 2021/213* (2013.01)

(58) Field of Classification Search
CPC .... G01J 4/04; G01J 4/00; G01J 3/0224; G01J 3/447; G01J 3/02; G01J 3/021; G01J 3/42; G01J 3/0218; G01J 3/10; G01J 9/00; G01J 3/2823; G01J 11/00; G01J 3/0208; G01J 3/08; G01J 2003/2866; G01J 3/36; G01J 3/4406; G01J 4/02; G01J 1/0429; G01J 1/4257; G01J 2004/001; G01J 3/12;
(Continued)

(56) References Cited

U.S. PATENT DOCUMENTS 7,023,546 B1 * 4/2006 McMillan ............. G01J 3/2823
356/364
7,349,089 B1 * 3/2008 Efimov ..................... G01J 3/02
356/368
(Continued)

FOREIGN PATENT DOCUMENTS

CA 2380492 A1 * 2/2001 .............. G01J 3/447
EP 3528048 A1 * 8/2019 ............ G01J 3/0208
(Continued)

*Primary Examiner* — Michael P Stafira
(74) *Attorney, Agent, or Firm* — CKC & Partners Co., LLC

(57) ABSTRACT

We have invented an EUV spectroscopic polarimeter including a light receiving element, a first polarizing modulation element, a second polarizing modulation element, an energy splitting element and a light detecting and analyzing apparatus. The light receiving element is for receiving a target light. The first polarizing modulation element is rotatably connected to the light receiving element for generating a first polarized light. The second polarizing modulation element is rotatably connected to the first polarizing modulation element for generating a second polarized light. The energy splitting element receives the second polarized light so as to generate a modulated-polarization and energy-resolved light. The light detecting and analyzing apparatus receiving the polarization-modulated and energy-resolved light and providing a spectrum information by an analyzing algorithm which is able to retrieve the helicity, ellipticity, tilt angle and the degree of polarization for the whole spectrum of the target light.

10 Claims, 4 Drawing Sheets

(58) Field of Classification Search
CPC .. G01J 2004/005; G01J 3/0229; G01J 3/0291; G01J 3/1256; G01J 2003/1213; G01J 3/0237; G01J 3/28; G01J 3/433; G01J 3/453; G01J 3/50; G01J 9/04; G01J 1/0414; G01J 1/08; G01J 1/26; G01J 1/42; G01J 1/44; G01J 1/46; G01J 2003/1217; G01J 2004/004; G01J 2009/002; G01J 2009/0261; G01J 3/0272; G01J 3/14; G01J 3/18; G01J 3/1895; G01J 3/2803; G01J 3/32; G01J 3/44; G01J 3/4535; G01J 3/508; G01J 5/08; G01J 5/0821; G01J 5/58; G01J 7/00; G01J 9/02; G01J 1/02; G01J 1/0233; G01J 1/0247; G01J 1/04; G01J 1/0411; G01J 1/0477; G01J 1/10; G01J 1/16; G01J 1/4228; G01J 2001/4238; G01J 2001/4261; G01J 2003/1269; G01J 2003/1282; G01J 2003/1286; G01J 2003/1291; G01J 2003/2826; G01J 2003/452; G01J 2004/002; G01J 2009/0207; G01J 2009/0249; G01J 2009/0265; G01J 3/0205; G01J 3/0213; G01J 3/0216; G01J 3/0227; G01J 3/0235; G01J 3/0243; G01J 3/0256; G01J 3/0278; G01J 3/1809; G01J 3/26; G01J 3/4531; G01J 3/46; G01J 3/462; G01J 3/463; G01J 3/501; G01J 3/502; G01J 3/504; G01J 3/51; G01J 5/20; G01J 5/42; G01J 9/0246; G01J 1/0252; G01J 2005/0077; G01J 3/0286; G01J 5/10; G01J 5/59; G01N 21/21; G01N 21/211; G01N 21/23; G01N 21/9501; G01N 2021/4792; G01N 21/956; G01N 21/55; G01N 21/8806; G01N 21/47; G01N 21/95607; G01N 2021/8848; G01N 21/6445; G01N 2201/0683; G01N 21/474; G01N 21/4795; G01N 21/49; G01N 2021/213; G01N 21/19; G01N 21/8422; G01N 21/4788; G01N 21/27; G01N 2021/4709; G01N 21/4738; G01N 21/41; G01N 21/553; G01N 21/94; G01N 2201/06113; G01N 2201/0612; G01N 2021/4711; G01N 21/05; G01N 21/6458; G01N 21/95; G01N 21/95684; G01N 2021/212; G01N 2021/8825; G01N 21/274; G01N 21/552; G01N 21/90; G01N 15/0211; G01N 2021/9513; G01N 21/314; G01N 21/6428; G01N 21/6447; G01N 21/88; G01N 2021/0346; G01N 21/4133; G01N 21/645; G01N 15/0205; G01N 21/276; G01N 21/3581; G01N 21/45; G01N 2021/1793; G01N 2021/216; G01N 2021/218; G01N 2021/4707; G01N 21/1717; G01N 21/25; G01N 21/3518; G01N 21/59; G01N 21/636; G01N 21/6452; G01N 21/6456; G01N 2201/0221; G01N 2201/062; G01N 2021/1727; G01N 2021/215; G01N 2021/646; G01N 2021/8427; G01N 2021/8444; G01N 2021/8822; G01N 21/253; G01N 21/51; G01N 21/53; G01N 21/57; G01N 21/77; G01N 21/9503; G01N 2201/0813; G01N 2201/105; G01N 33/526; G01N 33/54366; G01N 33/54386; G01N 15/1434; G01N 2015/008; G01N 2015/0238; G01N 2021/1757; G01N 2021/1765; G01N 2021/214; G01N 2021/4153; G01N 2021/4714; G01N 2021/4716; G01N 2021/556; G01N 2021/6471; G01N 2021/6484; G01N 2021/8809; G01N 2021/8845; G01N 2021/8864; G01N 2021/8877; G01N 2021/8896; G01N 21/31; G01N 21/33; G01N 21/35; G01N 21/64; G01N 21/6402; G01N 21/71; G01N 21/78; G01N 21/84; G01N 21/8803; G01N 21/8851; G01N 21/8901; G01N 21/896; G01N 21/95623; G01N 21/958; G01N 22/00; G01N 2201/0636; G01N 2201/068; G01N 2201/0691; G01N 2201/12; G01N 15/05; G01N 15/06; G01N 15/14; G01N 15/1459; G01N 15/1475; G01N 2015/0084; G01N 2015/045; G01N 2015/1006; G01N 2015/1477; G01N 2015/1493; G01N 2015/1497; G01N 2021/1751; G01N 2021/1772; G01N 2021/178; G01N 2021/4126; G01N 2021/4735; G01N 2021/6417; G01N 2021/6421; G01N 2021/6423; G01N 2021/6478; G01N 2021/8438; G01N 2021/869; G01N 2021/8835; G01N 2021/8908; G01N 21/03; G01N 21/0332; G01N 21/255; G01N 21/3586; G01N 21/359; G01N 21/63; G01N 21/85; G01N 21/86; G01N 21/9505; G01N 21/9506; G01N 21/95692; G01N 2201/061; G01N 2201/0621; G01N 2201/0626; G01N 2201/063; G01N 2201/0631; G01N 2201/0635; G01N 2201/0642; G01N 2201/067; G01N 23/22; G01N 30/74; G01N 33/222; G01N 33/34; G01N 33/362; G01N 33/54373; G01N 33/551; G01N 33/552; G01N 33/56911; G01N 33/56944; G01N 33/56983; G01N 33/56988; G01N 11/08; G01N 15/02; G01N 15/0227; G01N 15/1404; G01N 2015/0046; G01N 2015/0053; G01N 2015/0065; G01N 2015/0222; G01N 2015/1075; G01N 2015/1413; G01N 2015/1486; G01N 2015/149; G01N 2021/0364; G01N 2021/1759; G01N 2021/217; G01N 2021/3595; G01N 2021/399; G01N 2021/4733; G01N 2021/4742; G01N 2021/4757; G01N 2021/478; G01N 2021/555; G01N 2021/559; G01N 2021/638; G01N 2021/6419; G01N 2021/6439; G01N 2021/6441; G01N 2021/6463; G01N 2021/6493; G01N 2021/755; G01N 2021/7773; G01N 2021/7779; G01N 2021/8411; G01N 2021/8416; G01N 2021/8472; G01N 2021/8645; G01N 2021/8681; G01N 2021/8816; G01N 2021/8854; G01N 2021/8874; G01N 2021/8887; G01N 2021/8917; G01N 2021/8918; G01N 2021/9511; G01N 2021/95646; G01N 2021/95676; G01N 21/251; G01N 21/256; G01N 21/3563;

G01N 21/39; G01N 21/4785; G01N
21/532; G01N 21/534; G01N 21/554;
G01N 21/954; G01N 2201/064; G01N
2201/0697; G01N 2201/102; G01N
2201/11; G01N 2201/1211; G01N
2333/135; G01N 2333/162; G01N
2333/22; G01N 2333/295; G01N
2333/315; G01N 25/72; G01N 33/02;
G01N 33/32; G01N 33/343; G01N
33/346; G01N 33/442; G01N 33/53;
G01N 33/543; G01N 33/547; G01N
2333/47; G01N 2800/52; G01N 2800/60;
G01N 33/57426; G01N 33/5743; G01N
33/57484; G01N 33/50; G01N 33/574;
G01N 2400/02; G01N 28/00285; G01N
33/6896; G01N 33/9433; G01N
2333/4703; G01N 2333/96472; G01N
33/573; G01N 33/57415; G01N 33/6893;
G01N 35/00; G01N 23/2251; G01N
33/06; G01N 35/1002; G01N 2035/0436;
G01N 2035/0443; G01N 35/10; G01N
2021/151; G01N 2030/8429; G01N
2030/8831; G01N 2035/00653; G01N
2035/1018; G01N 2035/1025; G01N
2223/07; G01N 2223/1016; G01N
2223/102; G01N 2223/507; G01N
2223/624; G01N 23/227; G01N 2333/11;
G01N 2333/195; G01N 2333/5751; G01N
2333/916; G01N 2333/918; G01N
2333/924; G01N 2400/00; G01N
2405/06; G01N 2405/10; G01N 27/00;
G01N 33/5008; G01N 33/502; G01N
33/532; G01N 33/54313; G01N 33/5432;
G01N 33/566; G01N 33/56916; G01N
33/583; G01N 33/586; G01N 33/68;
G01N 33/6842; G01N 33/74; G01N
35/00594; G01N 35/00603; G01N
35/1016; G01N 13/00; G01N 13/04;
G01N 15/0826; G01N 2001/4016; G01N
2013/003; G01N 2021/158; G01N
2021/8477; G01N 2035/00188; G01N
2035/103; G01N 21/15; G01N 2201/021;
G01N 2201/0693; G01N 2333/23; G01N
2333/25; G01N 2333/26; G01N 2400/10;
G01N 2400/38; G01N 2400/50; G01N
30/56; G01N 33/025; G01N 33/143;
G01N 33/5308; G01N 33/6845; G01N
33/6854; G01N 35/02; G01N 35/028

See application file for complete search history.

(56) References Cited

U.S. PATENT DOCUMENTS

| 7,869,040 B1* | 1/2011 | Kwak | G01J 3/0224 356/369 |
| 8,736,838 B2* | 5/2014 | Herzinger | G01N 21/211 356/364 |
| 2003/0081210 A1* | 5/2003 | Masaki | G01N 23/20 356/369 |

FOREIGN PATENT DOCUMENTS

| JP | 2003133212 A * | 5/2003 | G03F 7/70566 |
| WO | WO-9966286 A1 * | 12/1999 | G01N 21/211 |
| WO | WO-2011019457 A1 * | 2/2011 | G01N 23/227 |
| WO | WO-2020156975 A1 * | 8/2020 | H05G 2/008 |

* cited by examiner

EUV SPECTROSCOPIC POLARIMETER

BACKGROUND

Technical Field

The present disclosure relates to an optical measuring device. More particularly, the present disclosure relates to an EUV spectroscopic polarimeter.

Description of Related Art

Recently, generation and application of Extreme Ultraviolet (EUV) is getting more important in the related industry, and people would like to obtain complete optical characteristics of EUV for lithography as well as resolving the chirality and magnetization of elements and materials.

Nowadays, measuring device, such as ellipsometer has been used widely to film thickness for single layers or complex multilayer stacks ranging from a few angstroms or tenths of a nanometer to several micrometers with excellent accuracy. How to precisely characterize EUV polarization is the crucial technique for the next generation spectroscopic ellipsometry in the ultraviolet spectral region, since polarized EUV has become the primary light source for the next generation high-volume manufacturing of semiconductor device. Ellipsometer relies on a precise polarimeter that measures the change of polarization upon reflection or transmission of samples. Based on the analysis of the change of polarization of light, ellipsometry can yield information about layers that are thinner than the wavelength of the probing light itself, even down to a single atomic layer. Further, an energy-resolved EUV polarimeter, which precisely characterizes the polarization of EUV light as a function of the light's wavelength or energy (spectra), becomes an essential apparatus.

However, the characterization of EUV polarization is very challenging. Unlike light in the IR and visible region, EUV light is highly absorbed by any materials. There are no high-transmission elements, e.g., wave-plates, and polarizers, in the EUV and soft X-ray region of the spectrum. The next-generation surface characterization will highly rely on EUV light. Spectroscopic ellipsometry will employ broadband EUV light sources, which access to a large number of fundamental physical properties, for instance, the refractive index, band-to-band transitions, or electronic properties.

Hence, a measuring device which can measure more complete characterization of EUV polarization, such as the helicity, the ellipticity, the tilt angle, and the degree of polarization are needed in the related industry.

SUMMARY

According to one embodiment of the present disclosure, an EUV spectroscopic polarimeter includes a light receiving element, a first polarizing modulation element, a second polarizing modulation element, an energy splitting element and a light detecting and analyzing apparatus. The light receiving element is for receiving a target light. The first polarizing modulation element is rotatably connected to the light receiving element, wherein the target light passes through the first polarizing modulation element so as to generate a first polarized light. The second polarizing modulation element is rotatably connected to the first polarizing modulation element, wherein the first polarized light passes through the second polarizing modulation element so as to generate a second polarized light. The energy splitting element receives the second polarized light so as to generate a polarization-modulated and energy-resolved light. The light detecting and analyzing apparatus receiving the polarization-modulated and energy-resolved light and providing a spectrum information, wherein the spectrum information comprises at least one energy information.

DETAILED DESCRIPTION

Figure 1:
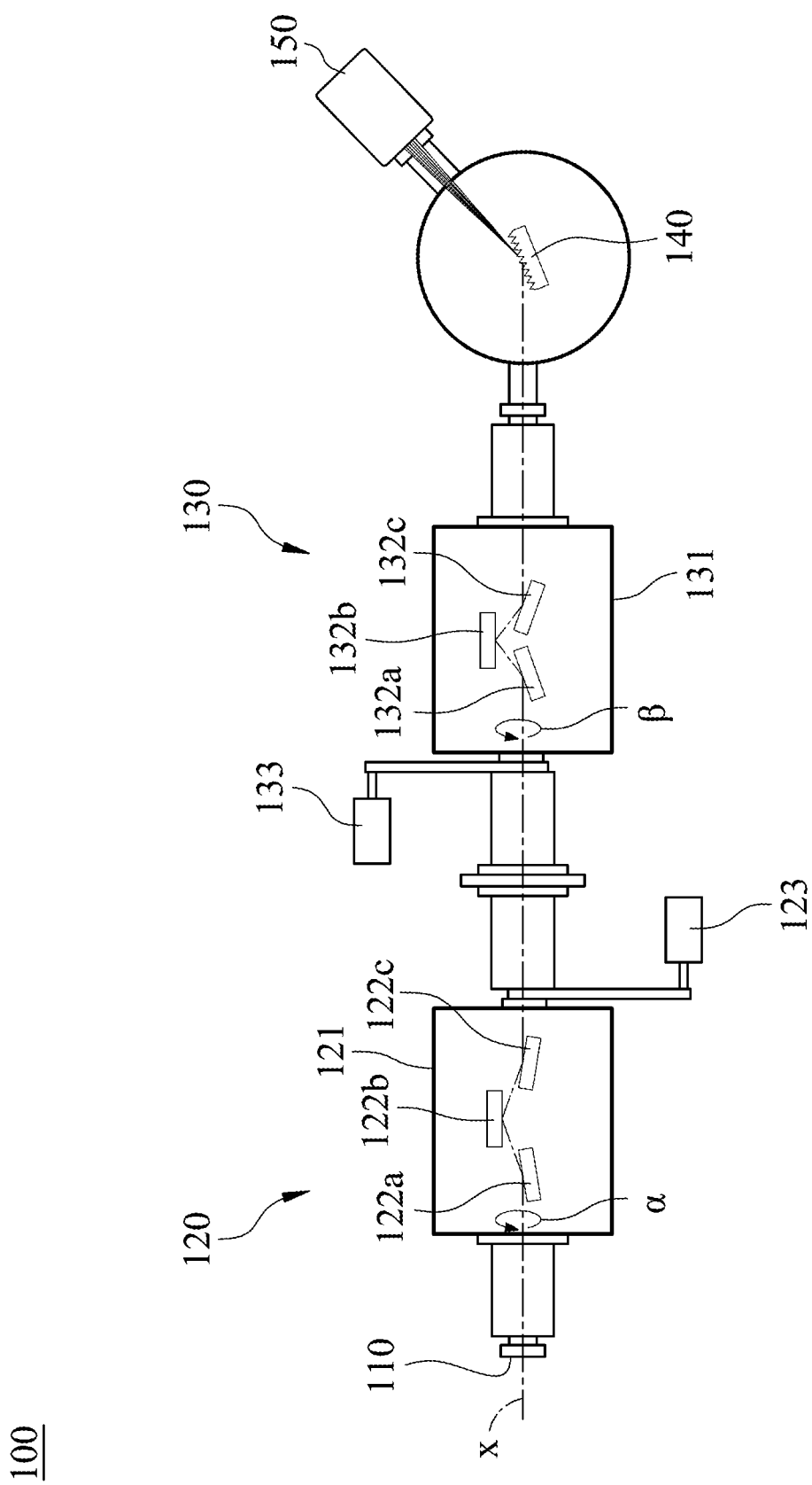
FIG. 1 shows a schematic view of an EUV spectroscopic polarimeter according to one embodiment of the present disclosure.

FIG. 1 shows a schematic view of an EUV spectroscopic polarimeter 100 according to one embodiment of the present disclosure. In FIG. 1, the EUV spectroscopic polarimeter 100 includes a light receiving element 110, a first polarizing modulation element 120, a second polarizing modulation element 130, an energy splitting element 140 and a light detecting and analyzing apparatus 150. The light receiving element 110 is for receiving a target light. The first polarizing modulation element 120 is rotatably connected to the light receiving element 110, wherein the target light passes through the first polarizing modulation element 120 so as to generate a first polarized light. The second polarizing modulation element 130 is rotatably connected to the first polarizing modulation element 120, wherein the first polarized light passes through the second polarizing modulation element 130 so as to generate a second polarized light. The energy splitting element 140 receives the second polarized light so as to generate a polarization-modulated and energy-resolved light. The light detecting and analyzing apparatus 150 receives the polarization-modulated and energy-resolved light and providing a spectrum information, wherein the spectrum information includes at least one energy information. Therefore, the EUV spectroscopic polarimeter 100 can measure the polarization properties of wide bandwidth light simultaneously so as to increase the measuring speed.

In detail, the target light can be EUV or soft X-ray beams, but will not be limited thereto.

The first polarizing modulation element 120 can include a vacuum chamber 121, at least one reflection member and a motor 123, wherein, according to the embodiment of FIG. 1, a number of the at least one reflection member of the first polarizing modulation element 120 is three, which are reflection members 122a, 122b, 122c, but the present disclosure will not be limited thereto. The vacuum chamber 121 is connected to the light receiving element 110, the reflection members 122a, 122b, 122c are located in the vacuum chamber 121. The motor 123 is for rotating the vacuum chamber 121 or the at least one reflection member; specifically, according to the embodiment of FIG. 1, the motor 123 is for rotating the vacuum chamber 121, but the present disclosure will not be limited thereto. Further, each of the reflection members 122a, 122b, 122c can be gold mirrors, but the present disclosure will not be limited thereto.

The second polarizing modulation element 130 can include a vacuum chamber 131, at least one reflection member and a motor 133, wherein, according to the embodiment of FIG. 1, a number of the at least one reflection member is three, which are reflection members 132a, 132b, 132c, but the present disclosure will not be limited thereto. The vacuum chamber 131 is connected to the vacuum chamber 121 of the first polarizing modulation element 120. The reflection members 132a, 132b, 132c are located in the vacuum chamber 131 of the second polarizing modulation element 130. The motor 133 is for rotating the vacuum chamber 131 of the second polarizing modulation element 130 or the at least one reflection member of the second polarizing modulation element 130; specifically, according to the embodiment of FIG. 1, the motor 133 is for rotating the vacuum chamber 131 of the second polarizing modulation element 130. Further, each of the reflection members 132a, 132b, 132c can be gold mirrors, but the present disclosure will not be limited thereto.

According to the embodiment of FIG. 1, the energy splitting element 140 is a grating, and is made of gold coating. However, in other embodiments of the present disclosure, the energy splitting element 140 can be any diffraction element, such as prisms and gratings, and the present disclosure will not be limited thereto.

According to the arrangement of the light receiving element 110, the first polarizing modulation element 120, the second polarizing modulation element 130 and the energy splitting element 140, the polarization of the target light can be modulated, so that the light detecting and analyzing apparatus 150 can provide the spectrum information of the target light, and also resolve their polarization informations (energy-resolved polarization informations). Each energy information can include the ellipticity (the ratio of the minor axis to the major axis of elliptically polarized light), the helicity (left-handed or right-handed circular polarization), the tilt angle, and the degree of polarization (energy portion of pulses that is polarized) of the target light. In the meanwhile, both amplitude and phase modulations given by the first polarizing modulation element 120 and the second polarizing modulation element 130, together with the amplitude modulation of the energy splitting element 140 between s-polarization and p-polarization can be solved simultaneously.

Figure 2:
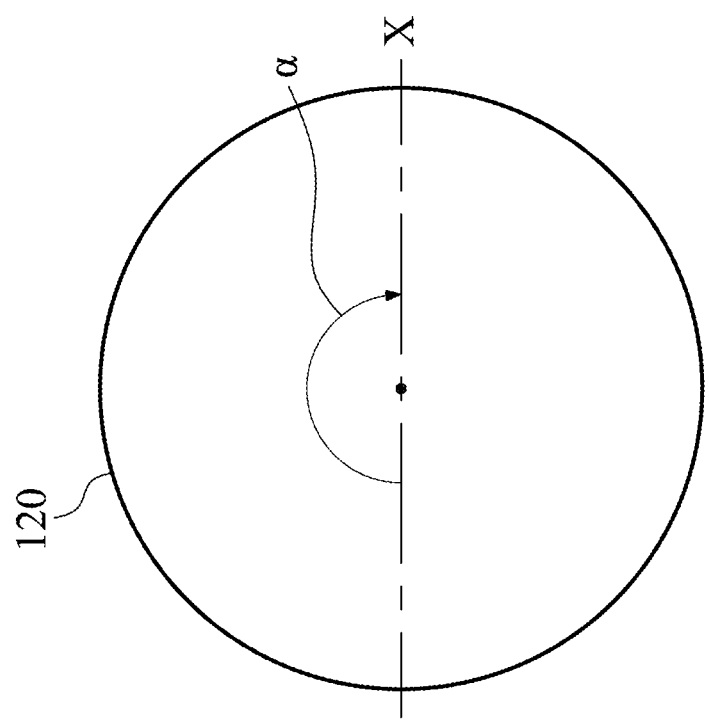
FIG. 2 is a schematic view of the first polarizing modulation element and a horizontal plane according to the embodiment of FIG. 1.

The light detecting and analyzing apparatus 150 can provide polarization states, Stoke parameters, for whole spectrum, that is, the light detecting and analyzing apparatus 150 can provide spectrum and also their polarization states according to the nine parameters (the nine unknowns), which are four Stoke parameters of the target light, an amplitude modulation of the first polarizing modulation element 120, a phase retarder of the first polarizing modulation element 120, an amplitude modulation of the second polarizing modulation element 130, a phase retarder of the second polarizing modulation element 130, and an amplitude modulation of the energy splitting element 140. Please refer to FIG. 2, which is a schematic view of the first polarizing modulation element 120 and a horizontal plane X according to the embodiment of FIG. 1. In detail, in FIG. 1 and FIG. 2, due to the independent rotating structure (the motors 123, 133) of the first polarizing modulation element 120 and the second polarizing modulation element 130, the first polarizing modulation element 120 can be rotated along a rotating direction α, the second polarizing modulation element 130 can be rotated along a rotating direction β, and the rotating angles can be defined as the angle of each of the first polarizing modulation element 120 and the second polarizing modulation element 130 respective to the horizontal plane X.

In one example of the embodiment of FIG. 1, the photon energies of the target light are 23 eV, 26 eV, 29 eV and 32 eV, and each of the first polarizing modulation element 120 and the second polarizing modulation element 130 provides four angles, so that 16-(α,β) combinations are applied, such as (0, 0), (0, π/4), (0, π/2), (0, 3π/4), (π/4, 0), (π/4, π/4), (π/4, π/2), (π/4, 3π/4), (π/2, 0) (π/2, π/4), (π/2, π/2), (π/2, 3π/4), (3π/4, 0), (3π/4, π/4), (3π/4, π/2), and (3π/4, 3π/4).

Each of the Stoke parameters of the target light is $S_{in}$. After the target light passing through the first polarizing modulation element 120, the second polarizing modulation element 130 and the energy splitting element 140, the light detecting and analyzing apparatus 150 can provide the Stoke vector of the output target light $S_{out}$ as the formulas (1), (2) and (3).

$$S_{out} = M(\gamma_3, \Delta_3)R(-\beta)M(\gamma_2, \Delta_2)R(\beta)R(-\alpha)M(\gamma_1, \Delta_1)R(\alpha)S_{in}; \quad (1)$$

$$M(\gamma, \Delta) = \begin{bmatrix} 1 & \cos 2\gamma & 0 & 0 \\ \cos 2\gamma & 1 & 0 & 0 \\ 0 & 0 & \sin 2\gamma \cos\Delta & -\sin 2\gamma \sin\Delta \\ 0 & 0 & \sin 2\gamma \sin\Delta & \sin 2\gamma \cos\Delta \end{bmatrix}; \quad (2)$$

and $$R(\theta) = \begin{bmatrix} 1 & 0 & 0 & 0 \\ 0 & \cos 2\theta & \sin 2\theta & 0 \\ 0 & -\sin 2\theta & \cos 2\theta & 0 \\ 0 & 0 & 0 & 1 \end{bmatrix}. \quad (3)$$

Wherein M is Mueller matrix defined to transform the incident Stoke vector into the exiting Stoke vector, R is rotation matrix, $\gamma^1$ is the amplitude modulation of the first polarizing modulation element 120, $\gamma^2$ is the amplitude modulation of the second polarizing modulation element 130, $\gamma^3$ is the amplitude modulation of the energy splitting element 140, $\Delta_1$ is the phase retarder of the first polarizing modulation element 120, $\Delta_2$ is the phase retarder of the second polarizing modulation element 130, α and β are the angles of the first polarizing modulation element 120 and the second polarizing modulation element 130, respectively.

After expanding the whole matrix chains, $S_{out}$ can be obtained as the formula (4):

$$S_{out} = S_0 = K \times F(S_1/S_0, S_2/S_0, S_3/S_0, \gamma_1, \gamma_2, \gamma_3, \Delta_1, \Delta_2; \alpha, \beta), \quad (4)$$

$$= K + \cos 2\gamma_3\{(\cos 2\beta \sin 2\beta - \cos 2\beta \sin 2\beta \sin 2\gamma_2 \cos\Delta_2) \times$$

$$[S_1/S_0(\cos 2\alpha \sin 2\alpha - \cos 2\alpha \sin 2\alpha \sin 2\gamma_1 \cos\Delta_1) +$$

$$K \sin 2\alpha \cos 2\gamma_1 + S_2/S_0[(\sin 2\alpha)^2 + (\cos 2\alpha)^2 \sin 2\gamma_1 \cos\Delta_1] -$$

-continued $S_3/S_0\cos2\alpha\sin2\gamma_1\sin\Delta_1] + [(\cos2\beta)^2 + (\sin2\beta)^2(\sin2\gamma_2\cos\Delta_2] \times$ $[K\cos2\alpha\cos2\gamma_1 + S_2/S_0[\cos2\alpha\sin2\alpha - \cos2\alpha\sin2\alpha\sin2\gamma_1\cos\Delta_1] +$ $S_1/S_0[(\cos2\alpha)^2 + (\sin2\alpha)^2\sin2\gamma_1\cos\Delta_1] + S_3/S_0\sin2\alpha\sin2\gamma_1\sin\Delta_1] +$ $\cos2\beta\cos2\gamma_2[K + S_1/S_0\cos2\alpha\cos2\gamma_1 + S_2/S_0\sin2\alpha\cos2\gamma_1] +$ $\sin2\beta\sin2\gamma_2\sin\Delta_2[S_3/S_0\sin2\gamma_1\cos\Delta_1 + S_2/S_0\cos2\alpha\sin2\gamma_1\sin\Delta_1 -$ $S_1/S_0\sin2\alpha\sin2\gamma_1\sin\Delta_1]\} + \cos2\beta\cos2\gamma_2\{K\cos2\alpha\cos2\gamma_1 +$ $S_2/S_0(\cos2\alpha\sin2\alpha - \cos2\alpha\sin2\alpha\sin2\gamma_1\cos\Delta_1) +$ $S_1/S_0[(\cos2\alpha)^2 + (\sin2\alpha)^2\sin2\gamma_1\cos\Delta_1] + S_3/S_0\sin2\alpha\sin2\gamma_1\cos\Delta_1\} +$ $\sin2\beta\cos2\gamma_2\{S_1/S_0(\cos2\alpha\sin2\alpha - \cos2\alpha\sin2\alpha\sin2\gamma_1\cos\Delta_1) +$ $K\sin2\alpha\cos2\gamma_1 + S_2/S_0[(\sin2\alpha)^2 + (\cos2\alpha)^2\sin2\gamma_1\cos\Delta_1] -$ $S_3/S_0\cos2\alpha\sin2\gamma_1\sin\Delta_1\} + S_1/S_0\cos2\alpha\cos2\gamma_1 + S_2/S_0\sin2\alpha\cos2\gamma_1;$ where K is a constant of the broadband EUV spectroscopic polarimeter 100. Thus, there are nine unknowns, K, $S_1/S_0$, $S_2/S_0$, $S_3/S_0$, $\gamma_1$, $\gamma_2$, $\gamma_3$, $\Delta_1$, $\Delta_2$, and nine different equations by changing the angle $\alpha$ of the first polarizing modulation element 120 and the $\beta$ of the second polarizing modulation element 130 are needed to solve the nine unknowns. In addition, an energy splitting element 140 and a light detecting and analyzing apparatus 150 obtain the spectrum. According to the example, 16-($\alpha$, $\beta$) combination angles of (0, 0), (0, π/4), (0, π/2), (0, 3π/4), (π/4,0), (π/4, π4), (π/4, π/2), (π/4, 3π/4), (π/2, 0), (π/2, π/4), (π/2, π/2), (π/ 2, 3π/4), (3π/4, 0), (3π/4, π/4), (3π/4, π/2), and (3π/4, 3π/4) respective to the horizontal plane X are selected.

Nine equations are applied to the genetic algorithm to minimize the deviation between those 16-($\alpha$, $\beta$) theoretical values by using equation (4) and the experimental observations. Hence, the Stoke parameters $S_1$, $S_2$, $S_3$ can be solved by the above 16 equations, so as to further calculate the ellipticity ε the degree of polarization p, and the tilt angle θ as the formulas (5), (6) and (7):

$$\varepsilon = \tan\left[\frac{1}{2}\mathrm{atan}\left(\frac{S_3}{\sqrt{S_1^2 + S_2^2}}\right)\right]; \quad (5)$$

$$p = \frac{\sqrt{S_1^2 + S_2^2 + S_3^2}}{S_0}; \quad (6)$$

and $$\theta = \frac{1}{2}\mathrm{atan}\left(\frac{S_2}{S_1}\right). \quad (7)$$

Figure 3:
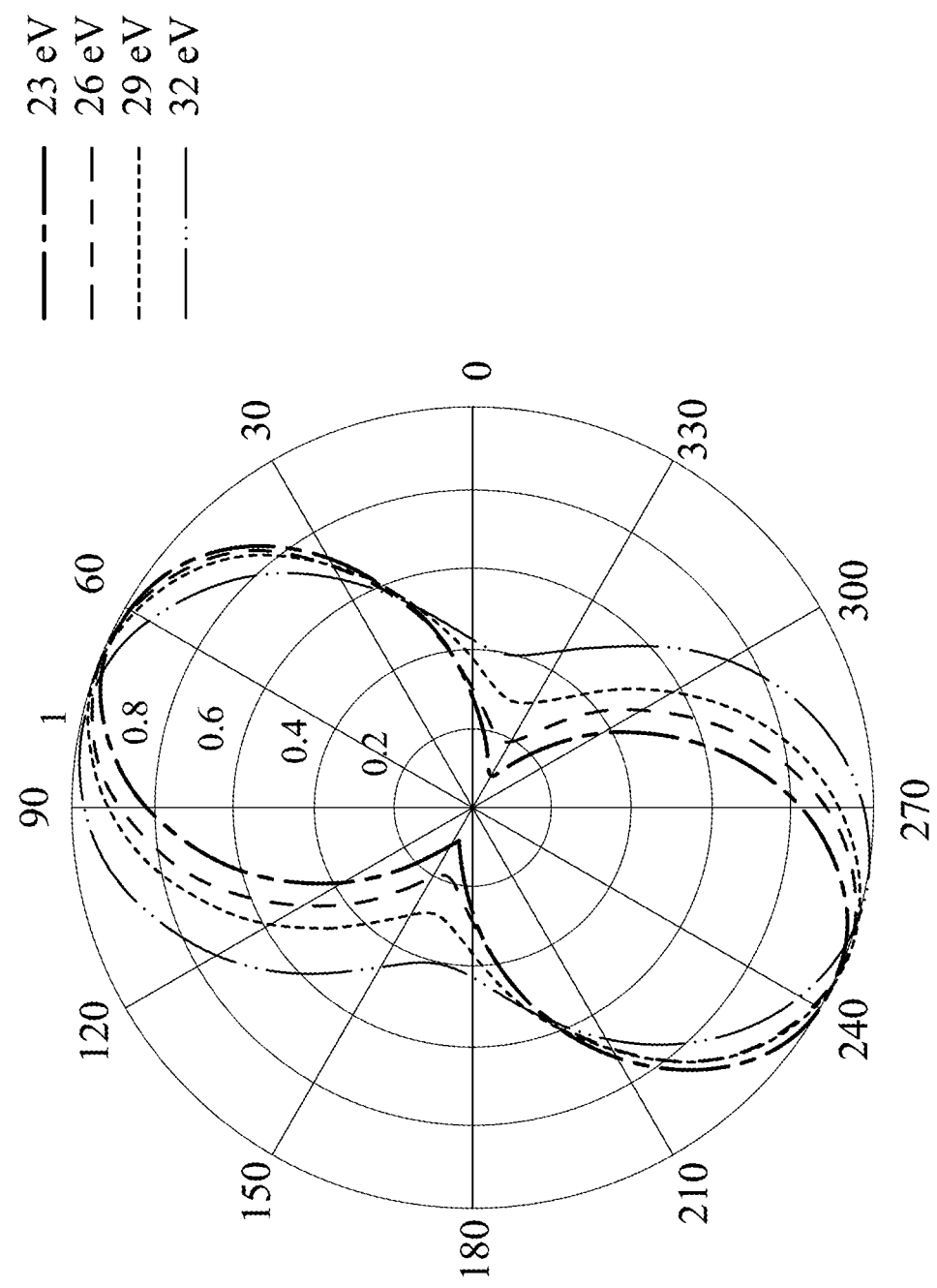
FIG. 3 shows the polarization states at the four photon energies of the target light depicted in the polar plots.

Please refer to FIG. 3 and Table 1, wherein FIG. 3 represents the polarization states of the four photon energies of the target light depicted in the polar plots, and Table 1 is the polarization information of each of the photon energies of the target light which are characterized by the light detecting and analyzing apparatus 150.

TABLE 1

| Photon energy (eV) | Helicity | Ellipticity | Tilt angle (degrees) | Degree of polarization (%) |
|---|---|---|---|---|
| 23 | R | 0.761 | −8.8 | 100.9 |
| 26 | R | 0.72 | −18.9 | 100.2 |

TABLE 1-continued

| Photon energy (eV) | Helicity | Ellipticity | Tilt angle (degrees) | Degree of polarization (%) |
|---|---|---|---|---|
| 29 | R | 0.663 | −25.2 | 85 |
| 32 | R | 0.584 | −29.2 | 81.3 |

According to the FIG. 3 and Table 1, it is known that the EUV spectroscopic polarimeter 100 can provide energy-resolved polarization information of the target light.

Figure 4:
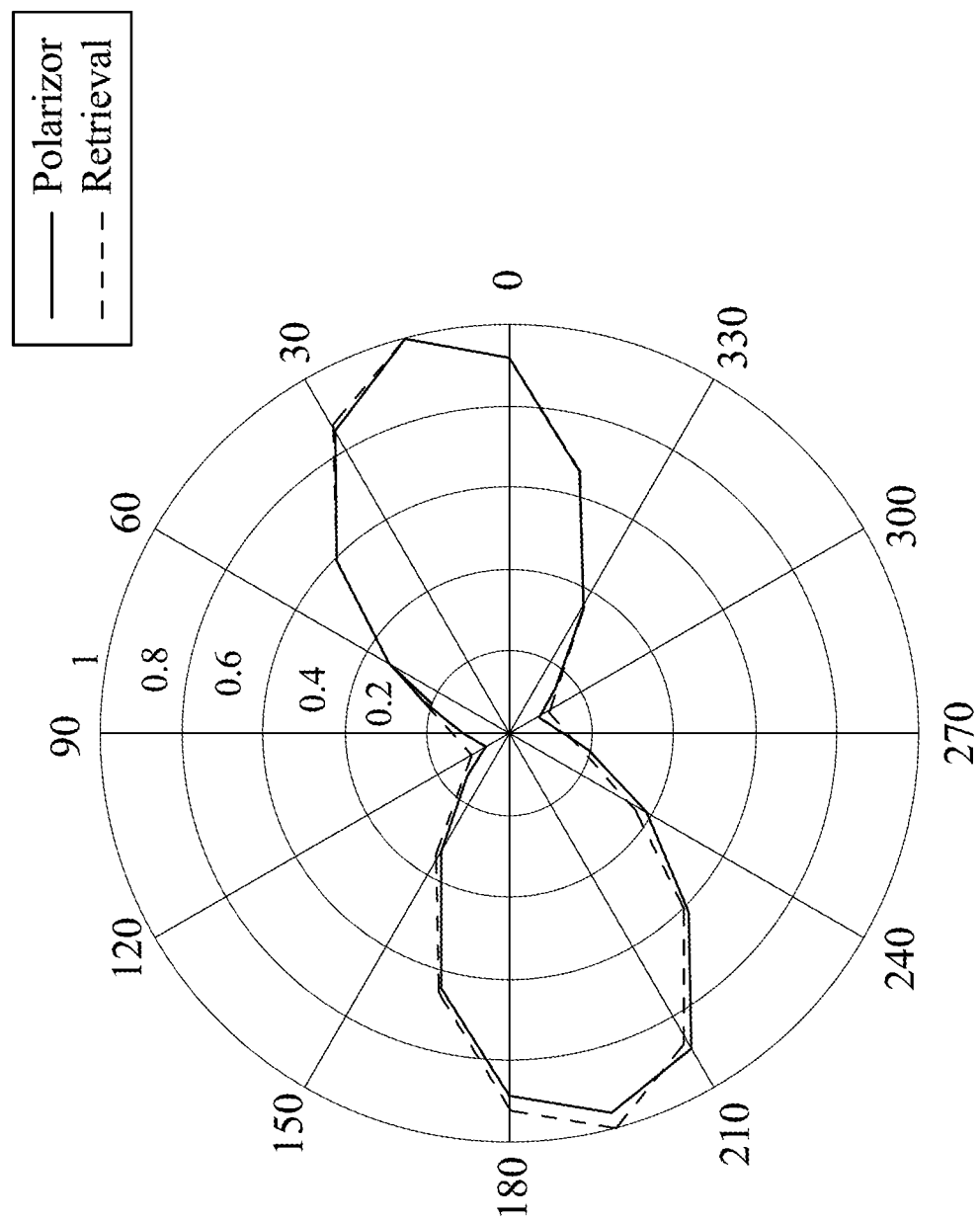
FIG. 4 shows polarization states of the target light measured by the EUV spectroscopic polarimeter (Retrieval) according to FIG. 1 and an EUV polarizor result (Polarizor).

FIG. 4 shows polarization states of the target light (EUV) measured by an EUV polarizer (Polarizor mode), and the broadband EUV spectroscopic polarimeter 100 (Retrieval mode) according to FIG. 1. For the validity confirmation of the energy-resolved polarimeter, a comparison was made by delivering two individual experiments. The first experiment (Polarizor mode) is to record the transmission of EUV light in one certain rotating sequence of $\alpha$ and $\beta$. In this example, we sample 24 points of the transmission of 32 eV light source by rotating two chambers incrementally in 360 degrees at the condition of $\alpha=\beta$. The solid line in FIG. 4 presents the EUV transmission as a function of the rotating angle $\alpha$. The following second experiment (Retrieval mode) is delivered to measure the EUV transmissions at the 16-($\alpha$, $\beta$) combinations of [0, 0], [0, π/4], [0, π/2], [0, 3π/4], [π/4,0], [π/4, π/4], [π/4, π/2], [π/4,3π/4], [π/2,0], [π/2, π/4], [π/2, π/2], [π/2,3π/4], [3π/4, 0], [3π/4, π/4], [3π/4, π/2] and [3π/4,3π/4]. Then listing these 16 equations based on equation (4), we solve and retrieve the polarization state of the 32 eV light source using a genetic algorithm, while also obtaining all unknowns parameters of amplitude and phase modulations from two rotating sets, and the amplitude modulation of the EUV grating between s- and p-polarizations. Based on those retrieval parameters, the dashed line is generated from the Mueller matrix calculation (equation (1)), following the angle sequence of the first experiment, in which $\alpha=\beta$. Two curves match with each other very well in the polar diagram, directly proving the validity of the energy-resolved EUV polarimeter.

Hence, according to the present disclosure, the EUV spectroscopic polarimeter can be taken as an energy-resolved polarimeter, which includes two rotatable sets of reflective polarizer (that is, the first polarizing modulation element and second polarizing modulation element) and one diffraction element (that is, energy splitting element), has extended the spectral range of the EUV spectroscopic polarimeter to the EUV and soft X-ray spectral region with unprecedented sensitivity because of their short wavelengths.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. An EUV spectroscopic polarimeter, which is operated in a vacuum-based environment, comprising:
   a light entrance for receiving a target light;
   a first polarizing modulation element rotatably connected to the light entrance, wherein the target light passes through the first polarizing modulation element so as to generate a first polarized light;
   a second polarizing modulation element rotatably connected to the first polarizing modulation element, wherein the first polarized light passes through the second polarizing modulation element so as to generate a second polarized light;
   dispersive element receiving the second polarized light so as to generate a polarization-modulated and wavelength-resolved light; and
   a light detecting and analyzing apparatus receiving the polarization-modulated and wavelength-resolved light and providing a spectrum information, wherein the spectrum information comprises at least one energy information.

2. The EUV spectroscopic polarimeter of claim 1, wherein the first polarizing modulation element comprises:
   a vacuum chamber connected to the light entrance;
   at least one reflection member located in the vacuum chamber; and
   a motor for rotating the vacuum chamber or the at least one reflection member.

3. The EUV spectroscopic polarimeter of claim 2, wherein a number of the at least one reflection member of the first polarizing modulation element is three.

4. The EUV spectroscopic polarimeter of claim 2, wherein the second polarizing modulation element comprises:
   a vacuum chamber connected to the vacuum chamber of the first polarizing modulation element;
   at least one reflection member located in the vacuum chamber of the second polarizing modulation element; and
   a motor for rotating the vacuum chamber of the second polarizing modulation element or the at least one reflection member of the second polarizing modulation element.

5. The EUV spectroscopic polarimeter of claim 4, wherein a number of the at least one reflection member of the second polarizing modulation element is three.

6. The EUV spectroscopic polarimeter of claim 4, wherein each of the at least one reflection member of the first polarizing modulation element and the at least one reflection member of the second polarizing modulation element is a gold mirror.

7. The EUV spectroscopic polarimeter of claim 1, wherein the dispersive element is a grating.

8. The EUV spectroscopic polarimeter of claim 1, wherein the dispersive element is a prism.

9. The EUV spectroscopic polarimeter of claim 1, wherein the target light is EUV or soft X-ray beams.

10. The EUV spectroscopic polarimeter of claim 1, wherein the light detecting and analyzing apparatus provides wavelength-resolved Stoke parameters.

* * * * *